United States Patent [19]

Tang et al.

[11] Patent Number: 5,964,892
[45] Date of Patent: Oct. 12, 1999

[54] GENERAL PURPOSE INTERFACE BUS (GPIB) SYSTEM AND METHOD WHICH PROVIDES GPIB CALL CAPTURE AND DISPLAY

[75] Inventors: Tieming Tang; Clay Bean, both of Austin, Tex.

[73] Assignee: National Instruments Corp., Austin, Tex.

[21] Appl. No.: 08/920,479

[22] Filed: Aug. 29, 1997

[51] Int. Cl.$^6$ .................................................. G06F 11/30
[52] U.S. Cl. .................................................. 714/38
[58] Field of Search .................. 395/183.14, 183.19, 395/309, 835, 838; 714/38, 43; 710/129, 15, 18

[56] References Cited

U.S. PATENT DOCUMENTS

| | | | |
|---|---|---|---|
| 5,572,525 | 11/1996 | Shen et al. | 371/22.1 |
| 5,649,123 | 7/1997 | Kowert | 395/289 |
| 5,649,129 | 7/1997 | Kowert | 395/309 |

OTHER PUBLICATIONS

NI–488.2 User Manual for Windows, January 1996 Edition, Part Number 320701B0–01, pp. 6–1 through 6–5.
1996 Instrumentatio Reference and Catalogue, Test and Measurement Industrial Automation, cover page, contents page, pp. 2–112.

*Primary Examiner*—Thomas M. Heckler
*Attorney, Agent, or Firm*—Conley, Rose & Tayon; Jeffrey C. Hood

[57] ABSTRACT

A software monitor utility is disclosed which capture and displays General Purpose Interface Bus (GPIB) calls made to GPIB driver software in real time. The GPIB driver software controls a GPIB interface. The GPIB interface is coupled to one or more GPIB instruments. The monitor utility is configured to record and display both the start and end time of a GPIB operation, where end time is the time control is returned to the GPIB application. In addition, for asynchronous GPIB calls, the monitor utility records and displays the end time of the corresponding asynchronous operation. Also, the monitor utility provides the option of substituting a monitor-enabled version of a key driver module for a non-enabled version upon entrance to the utility. Furthermore, an option of provided for restoration of the non-monitor-enabled version upon exit from the utility.

28 Claims, 11 Drawing Sheets

Synchronous Case

Synchronous Case

Asynchronous Case

| Number | GPIB Calls | ibsta | iberr | ibcntl | Time |
|---|---|---|---|---|---|
| 0 | ibdev(0. 1. 0(0x0) T10s(13) 1. 0x0000) | 0x0100 | 0 | 0(0x0) | 11:44:55.650 |
| 1 | ibclr(UD0) | 0x0100 | 0 | 4(0x4) | 11:44:58.120 |
| 2 | ibwrt(UD0,"idn?",5 (0x5)) | 0x0100 | 0 | 5(0x5) | 11:45:19.260 |
| 3 | ibrd(UD0,"FLUKE,45, 47...",100 (0x64)) | 0x2900 | 0 | 29(0x1D) | 11:45:23.550 |
| 4 | ibwt(UD0, "rst; vac; au..", 35 (0x23)) | 0x0900 | 0 | 35(0x23) | 11:45:47.990 |
| 5 | ibtrg(UD0) | 0x0900 | 0 | 4(0x4) | 11:45:55.290 |
| 6 | ibwrt(UD0, "val1?",5(0x5)) | 0x0900 | 0 | 5(0x5) | 11:46:13.970 |
| 7 | ibrda(UD0, 0x00770E70, 20 (0x14)) | 0x0800 | 0 | 0(0x0) | 11:46:20.510 |
| 8 | ibwait(UD0, 0x4100) | 0x2900 | 0 | 10(0xA) | 11:46:39.730 |
| 9 | Async I/O Resynchronized for ibrda(UD0, 0x00770E70, 20 (0x14)) | 0x2900 | 0 | 10(0xA) | 11:46:40.220 |
| 10 | ibonl(UD0, 0) | 0x0100 | 0 | 10(0xA) | 11:47:28.120 |

FIG. 6

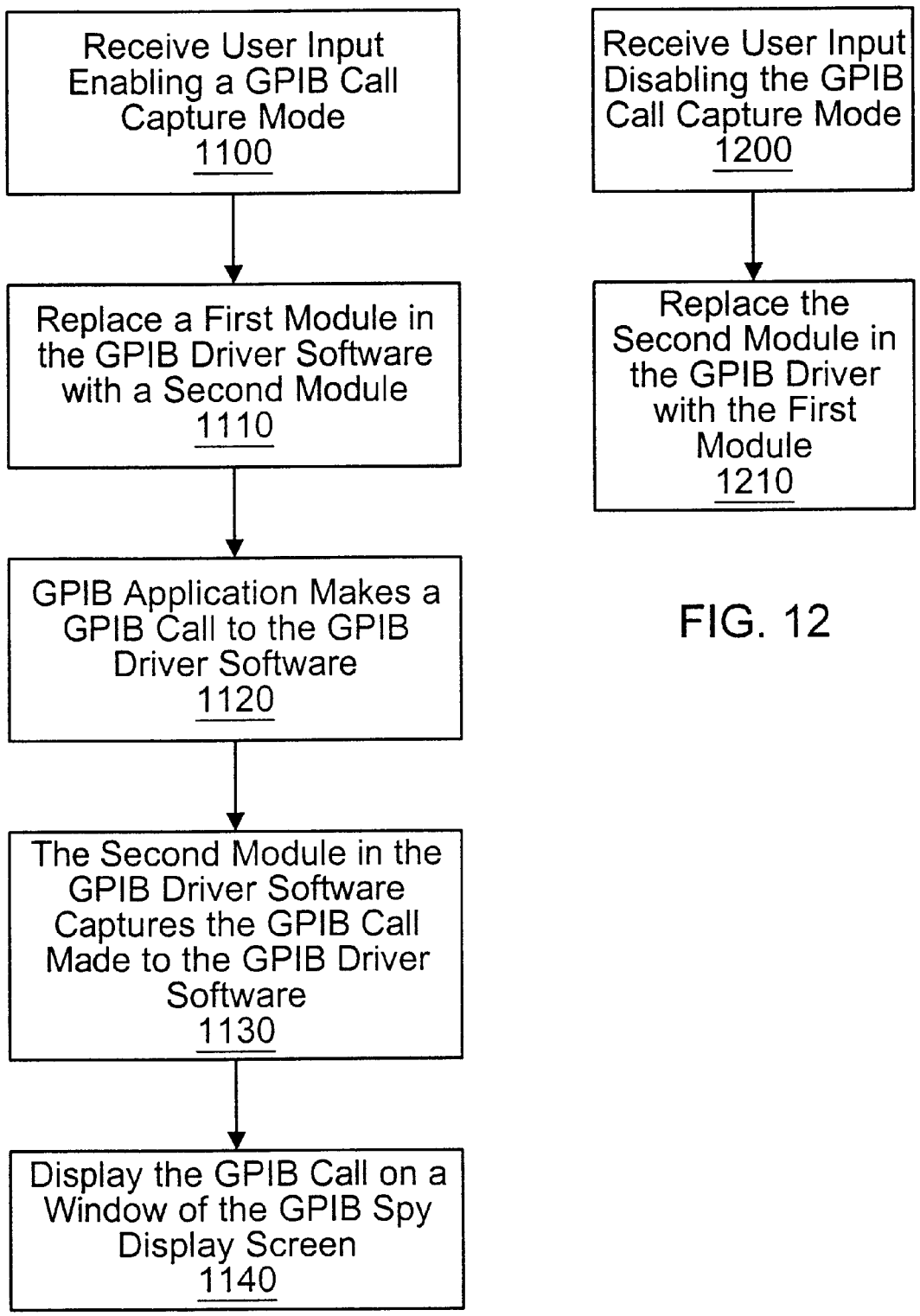

GENERAL PURPOSE INTERFACE BUS (GPIB) SYSTEM AND METHOD WHICH PROVIDES GPIB CALL CAPTURE AND DISPLAY

FIELD OF THE INVENTION

The present invention relates to software diagnostic tools for monitoring and displaying calls made to driver software by an application.

DESCRIPTION OF THE RELATED ART

The IEEE 488 bus, also referred to as the General Purpose Interface Bus (GPIB), is used for connecting instruments and controllers to a common bus to perform various test and measurement functions. A typical GPIB system comprises one or more GPIB instruments, up to 14 instruments, and a controller, typically a GPIB interface board installed in a general purpose computer, connected by standard GPIB cables. A GPIB software application executes on the computer to control the instruments. The GPIB application interfaces through GPIB driver level software to the GPIB controller.

In response to the GPIB application, the controller provides program commands to the instruments, and the instruments return formatted data and response messages to the controller. GPIB instruments are message-based devices which are programmed with high-level ASCII character strings. A respective GPIB device includes a local processor that parses the command strings and sets the appropriate register bits to perform the indicated functions.

The original ANSI IEEE 488 standard, now referred to as IEEE 488.1, was introduced in 1975 and greatly simplified the interconnection of programmable instruments by clearly defining mechanical, electrical and hardware protocol specifications. This enabled users to connect instruments from different manufacturers to a standard cable, thus allowing the instruments to communicate with each other. The original IEEE 488.1 standard dramatically improved the productivity of test engineers. However, this original standard included a number of limitations. More specifically, the IEEE 488.1 standard did not specify data formats, status reporting guidelines, a message exchange protocol, configuration commands, or a minimum set of device commands. As a result, different manufacturers implemented each item differently, resulting in integration problems for the test system developer.

In 1987, a new IEEE 488 standard for programmable instruments and devices was approved which strengthened the original IEEE 488.1 standard by precisely defining how controllers and instruments communicated with each other. The IEEE 488.2 standard kept the IEEE 488.1 standard completely intact while also defining standard data codes and formats, a status reporting model, a message exchange protocol, a set of common commands for all instruments, and controller requirements, therefore making systems more compatible and simplifying program development. In general, the IEEE 488.2 standard focuses on software protocol issues while the IEEE 488.1 standard is primarily hardware oriented.

Thus the ANSI/IEEE Standard 488.1-1987, also known as GPIB (General Purpose Interface Bus), describes a standard interface for communication between instruments and controllers from various vendors. The IEEE 488.1 standard contains information about electrical, mechanical, and functional specifications. The GPIB is a digital, 8-bit parallel communications interface with data transfer rates of 1 Mbytes/s and above, using a 3-wire handshake. The bus supports one System Controller, usually a computer, and up to 14 additional instruments. The ANSI/IEEE Standard 488.2-1992 extends IEEE 488.1 by defining a bus communication protocol, a common set of data codes and formats, and a generic set of common device commands.

As noted above, a GPIB system includes GPIB driver level software which interfaces between a GPIB application and the GPIB hardware. The de facto standard for GPIB driver level software are the NI-488 and NI-488.2 software architectures, collectively referred to as the NI-488 software architecture, which is available in the NI-488 and NI-488.2 driver software products available from National Instruments. The NI-488 software architecture includes an Application Programming Interface (API) which allows the GPIB application to call or invoke functions in the GPIB driver level software to communicate with the GPIB hardware. In other words, the GPIB driver level software handles the details of communication, i.e., the transfer of commands and data, over the GPIB connection between the computer and the GPIB instruments.

The NI-488 software includes a software monitor utility which captures and displays GPIB calls made by the GPIB application to the NI-488 driver software. This monitor software utility has the capacity to capture and display GPIB calls in real time. However, this software monitor utility does not include the features of (1) context sensitive time-stamping, and (2) driver module substitution upon entrance and exit to the monitor utility.

SUMMARY OF THE INVENTION

The present invention comprises a software monitor utility which monitors, records and displays GPIB calls made to GPIB driver software. The software monitor utility operates in the context of a GPIB instrumentation control system. The instrumentation control system includes a computer coupled to one or more GPIB instruments via a GPIB interface. The computer is equipped with a CPU, a display screen, memory, and one or more input devices such as a mouse or keyboard. The computer also provides a GPIB interface which mediates communication between the computer and the GPIB instrument. A GPIB device is preferably coupled to the control system, wherein the GPIB device may be an interface card or external GPIB device.

The software monitor utility of the present invention, GPIB Spy, comprises a computer-implemented method for monitoring GPIB calls made to the GPIB driver software by the GPIB application. The GPIB application makes a call to the GPIB driver software. The GPIB driver software captures the GPIB call and sends the captured call data to GPIB Spy (the software monitor utility). The captured call data includes the name of the GPIB call, the call input parameters, the call return parameters, the call assertion time, the call return time, and for asynchronous calls, the completion time of the asynchronous operation invoked by the call. Furthermore, for GPIB calls which involve reading from the instrument into a buffer, or writing from a buffer to the instrument, the captured call data includes the buffer contents.

In the preferred embodiment of the invention, GPIB Spy includes a Win32-based graphical user interface. GPIB Spy receives the captured call data and displays a summary of this data on a main window of the display screen. As the GPIB application makes repeated GPIB calls, GPIB Spy captures and displays the corresponding summary data for each GPIB call in real time.

GPIB Spy automatically records the start time and end time of a GPIB call, i.e. the time the GPIB call is received by the GPIB driver software, and the time the GPIB driver software returns control to the GPIB application. In response to the GPIB call, the GPIB driver software performs a GPIB operation. For synchronous GPIB calls, the GPIB driver software returns control to the GPIB application after the operation is complete. For asynchronous GPIB calls, the GPIB driver software returns control to the GPIB application immediately, and the operation completes some time later. For asynchronous GPIB calls, GPIB Spy records, in addition to the return-of-control time, the time the asynchronous operation completes. This ability to record the start time, return time, and in the case of asynchronous GPIB calls, the operation completion time, makes GPIB Spy a more useful diagnostic tool as compared to prior art GPIB monitor utilities.

As GPIB calls are captured, GPIB Spy displays in its main window a record of summary data for each GPIB call. The summary data includes the call name, the call input parameters, the values of the return parameters from the call, and the call start time. GPIB calls are displayed in order of their occurrence. GPIB Spy maintains a capture buffer of user configured depth. All GPIB calls in the capture buffer are displayed in the main window of the display screen. When the number of received GPIB calls exceeds the depth of the capture buffer, the oldest GPIB calls are lost. In other word, the capture buffer has a FIFO organization.

GPIB Spy allows the user to display more detailed information for any GPIB call that is resident in the main window (equivalently, capture buffer). The detailed data for a GPIB call is displayed, for example, by double-clicking anywhere on the summary data line for the GPIB call using the mouse button.

Typically, the user will invoke GPIB Spy in order to debug the GPIB calls made to the GPIB application. However, when the GPIB application has been debugged, the user may be especially interested in running the GPIB application without GPIB Spy, i.e. without GPIB call capture and display. To facilitate these different modes of operation, the GPIB driver software includes two modules which are interchangeable. The first module is designed without the existence of GPIB Spy in view, and thus does not include a software interface to GPIB Spy. In contrast, the second module is designed with the ability to capture GPIB calls and a software interface to send captured call data to GPIB Spy. In particular, the second module includes code which tests whether GPIB Spy capture mode is turned on, and if so, the second module sends captured GPIB call data to GPIB Spy. The first module, since it does not include capture capabilities, is more efficient and is the module of choice if the user is not concerned with GPIB call capture and display. The first and second modules perform the same function so far as the GPIB application is concerned. However, the second module includes the additional capability to capture GPIB calls and route them to GPIB Spy if capture mode is turned on.

When GPIB Spy is invoked by the user, GPIB Spy checks which of the two modules is resident in the GPIB driver software. If the second (Spy-enabled) module is not resident in the GPIB driver software, a dialog box appears which prompts the user for choice of either (a) replacing the first module with the second (Spy-enabled) module in the GPIB driver software, or (b) performing no replacement and therefore retaining the first module in the GPIB driver software. The first choice (a) is the default. If the user intends to use GPIB Spy to capture and display GPIB calls, the user must make selection (a), since the second module is essential for call capture. If the user intends to use GPIB Spy only to view previously saved Spy capture file(s), then the user may retain the first module by making the selection (b).

Furthermore, when the user has finished a session with GPIB Spy, the user may wish to replace the second (Spy-enabled) module with the first (streamlined) module into the GPIB driver software for the sake of other GPIB-oriented programs which are already debugged and thus do not require the Spy-enabled second module. GPIB Spy provides the user with an option for performing this replacement before exit.

In addition, GPIB Spy provides capabilities for (1) turning on/off call capture mode, (2) turning on/off file logging, (3) saving the contents of the capture buffer to a data file with extension Spy capture, (4) reading the contents of a previous stored Spy capture file, (5) storing buffer data in brief or full mode, (6) clearing the GPIB Spy capture buffer and thus main window, (7) printing the contents of the main window, and (8) invoking context-sensitive help.

BRIEF DESCRIPTION OF THE DRAWINGS

A better understanding of the present invention can be obtained when the following detailed description of the preferred embodiment is considered in conjunction with the following drawings, in which:

FIG. 6 presents a screen shot of the main window of the GPIB Spy graphical user interface according to the present invention;

FIG. 11 presents a flowchart for the operation of the present invention with the module replacement feature upon entrance to GPIB Spy; and FIG. 12 present a flowchart for the module restoration feature of the present invention;

Figure 1:
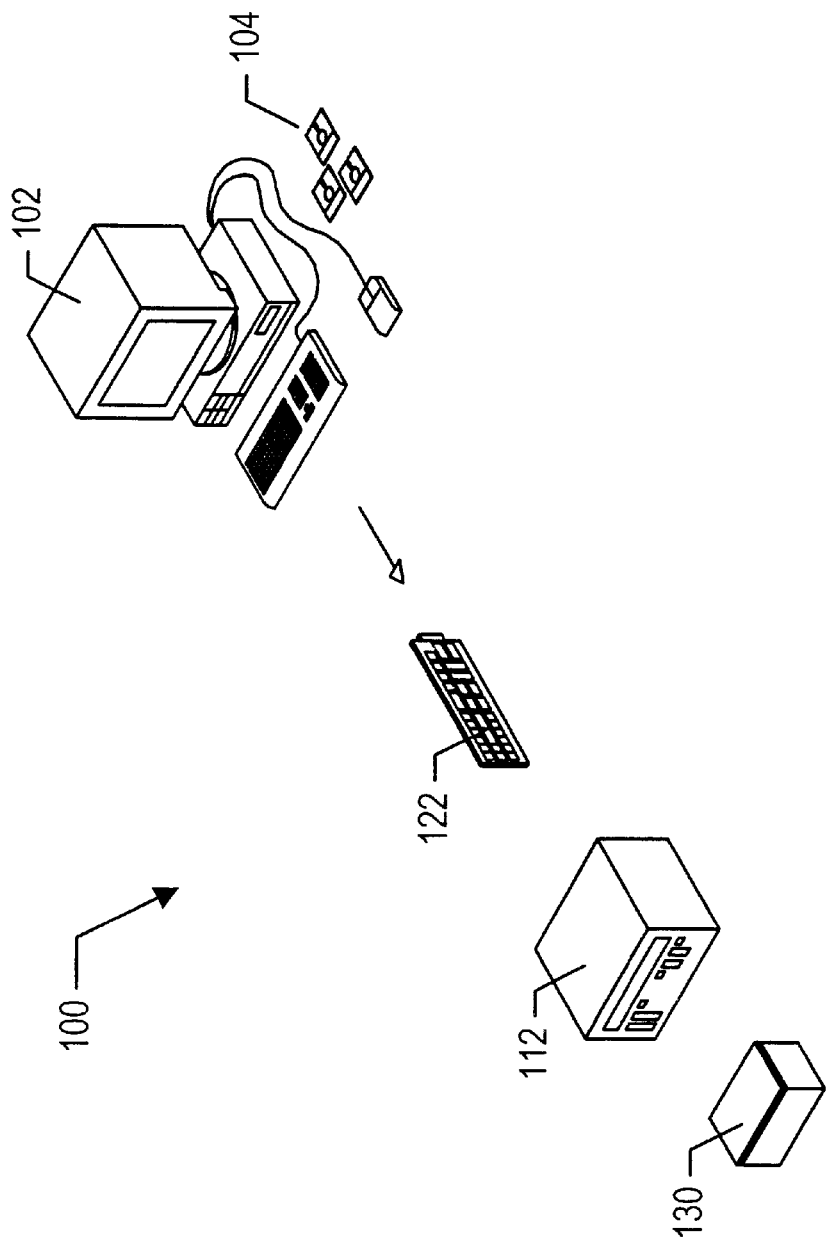
FIG. 1 illustrates a GPIB instrumentation system.

While the invention is susceptible to various modifications and alternative forms specific embodiments are shown by way of example in the drawings and will herein be described in detail. It should be understood however, that drawings and detailed descriptions thereto are not intended to limit the invention to the particular form disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Incorporation By Reference

The IEEE 488.1 specification and the IEEE 488.2 specification published by the IEEE are both hereby incorporated by reference in their entirety.

The NI-488 and NI-488.2 reference manuals, available from National Instruments Corporation, are hereby incorporated by reference in their entirety.

FIG. 1—GPIB Instrumentation System

Referring now to FIG. 1, a GPIB instrumentation control system 100 is shown. The system 100 comprises a computer 102 which connects to one or more GPIB instruments. The computer 102 comprises a CPU, a display screen, memory, and one or more input devices such as a mouse or keyboard as shown. The computer 102 connects to one or more GPIB instruments 112 to analyze, measure or control a unit under test (UUT) or process 130.

The GPIB instrument 112 is coupled to the computer 102 via a GPIB interface 122 provided by the computer 102. The GPIB interface 122 is typically plugged in to an I/O slot in the computer 102, such as a PCI bus slot, a PC Card slot, or an ISA, EISA or MicroChannel bus slot provided by the computer 102. However, the GPIB interface card 122 is shown external to computer 102 for illustrative purposes. It is noted that various other types of instruments may be comprised in the instrumentation system 100, such as a data acquisition board, a VXI instrument, or a serial instrument.

The GPIB instruments are coupled to the unit under test (UUT) or process 130, or are coupled to receive field signals, typically generated by transducers. The system 100 may be used in a data acquisition and control application, in a test and measurement application, a process control application, or a man-machine interface application, among others.

The computer 102 preferably includes a memory media, such as a magnetic media, CD-ROM, or floppy disks 104. The memory media preferably stores a GPIB application and also stores GPIB driver level software according to the present invention. The present invention comprises GPIB driver level software according to the present invention stored on a memory and/or hard drive of the computer 102 and executed by a CPU of the computer 102. The GPIB driver level software operates to enable the real-time capture and display of GPIB calls asserted by the GPIB application in a GPIB system. The CPU executing code and data from the memory thus comprises a means for allowing the monitoring of GPIB calls a GPIB system according to the steps described below.

Figure 2:
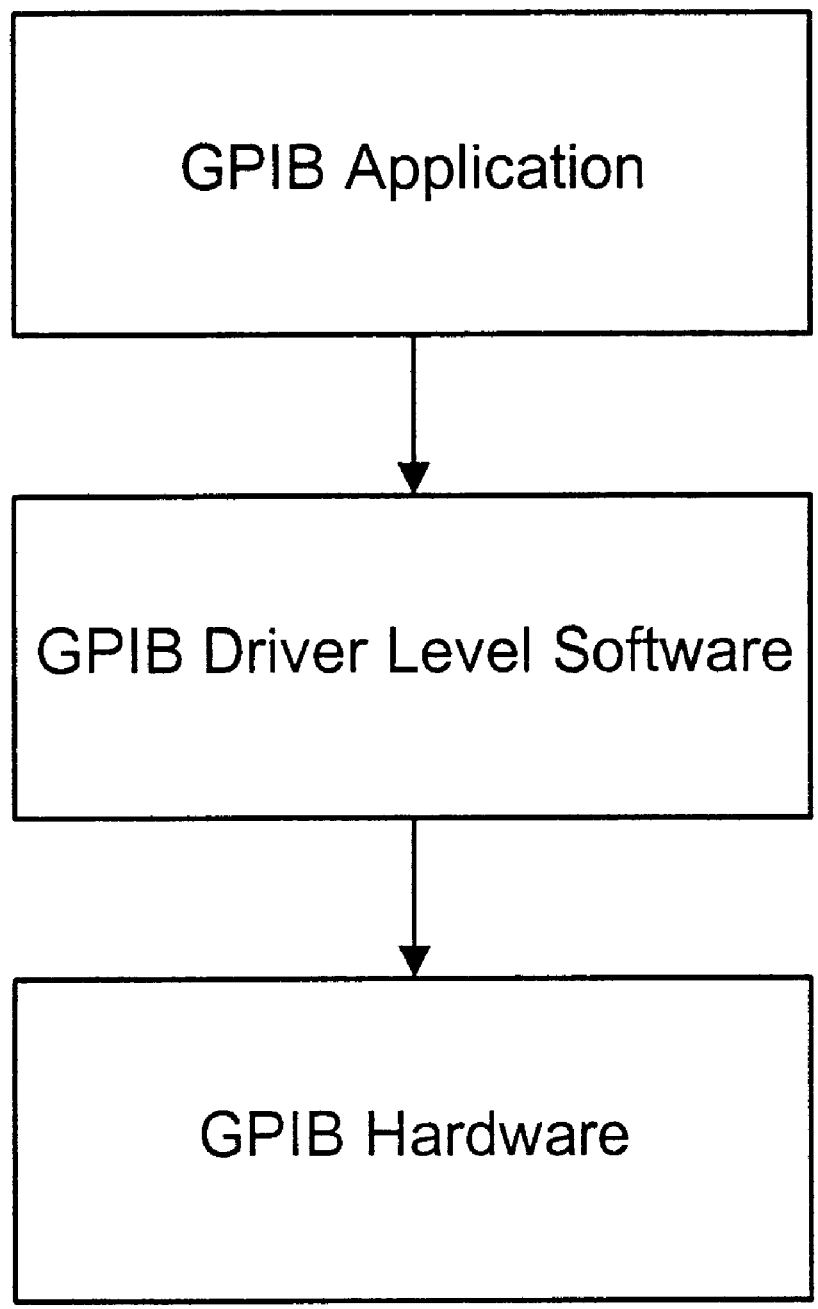
FIG. 2 illustrates the software architecture of the GPIB instrumentation system.

FIG. 2—GPIB Software Architecture

Referring now to FIG. 2, the software architecture for a GPIB instrumentation system is shown. As shown, the software architecture comprises a GPIB application which interfaces through GPIB driver level software to one or more GPIB instruments.

The top level of the software architecture typically comprises a GPIB application used for high level control of the GPIB instrument(s). The GPIB application may operate in conjunction with one or more instrument drivers to interface through the GPIB driver level software to the GPIB instruments. The GPIB application may be created with various development platforms, such as the LabVIEW graphical programming language or the LabWindows/CVI interactive C development environment. These software development environments include fully integrated GPIB libraries for instrument control. The GPIB application makes calls to various functions in the GPIB driver level software to communicate with the GPIB hardware.

The GPIB driver level software interfaces the commands or function calls in the GPIB application to the actual GPIB interface. In other words, in response to function calls made by the application, the GPIB driver level software communicates with the GPIB controller to control the GPIB instruments. The GPIB driver level software thus handles the details of communication, i.e., the transfer of commands and data, over the GPIB connection between the computer and the GPIB instruments. As discussed in the background section, the de facto standard for GPIB driver level software is the NI-488 software architecture available from National Instruments. The NI-488 software architecture includes an Application Programming Interface (API) which allows the GPIB application to call or invoke functions in the GPIB driver level software to communicate with the GPIB hardware.

As discussed above, the GPIB hardware comprises a GPIB interface 122, typically a plug-in card in a personal computer, which couples through the GPIB to one or more GPIB instruments.

FIG. 3: GPIB Spy

Figure 3:
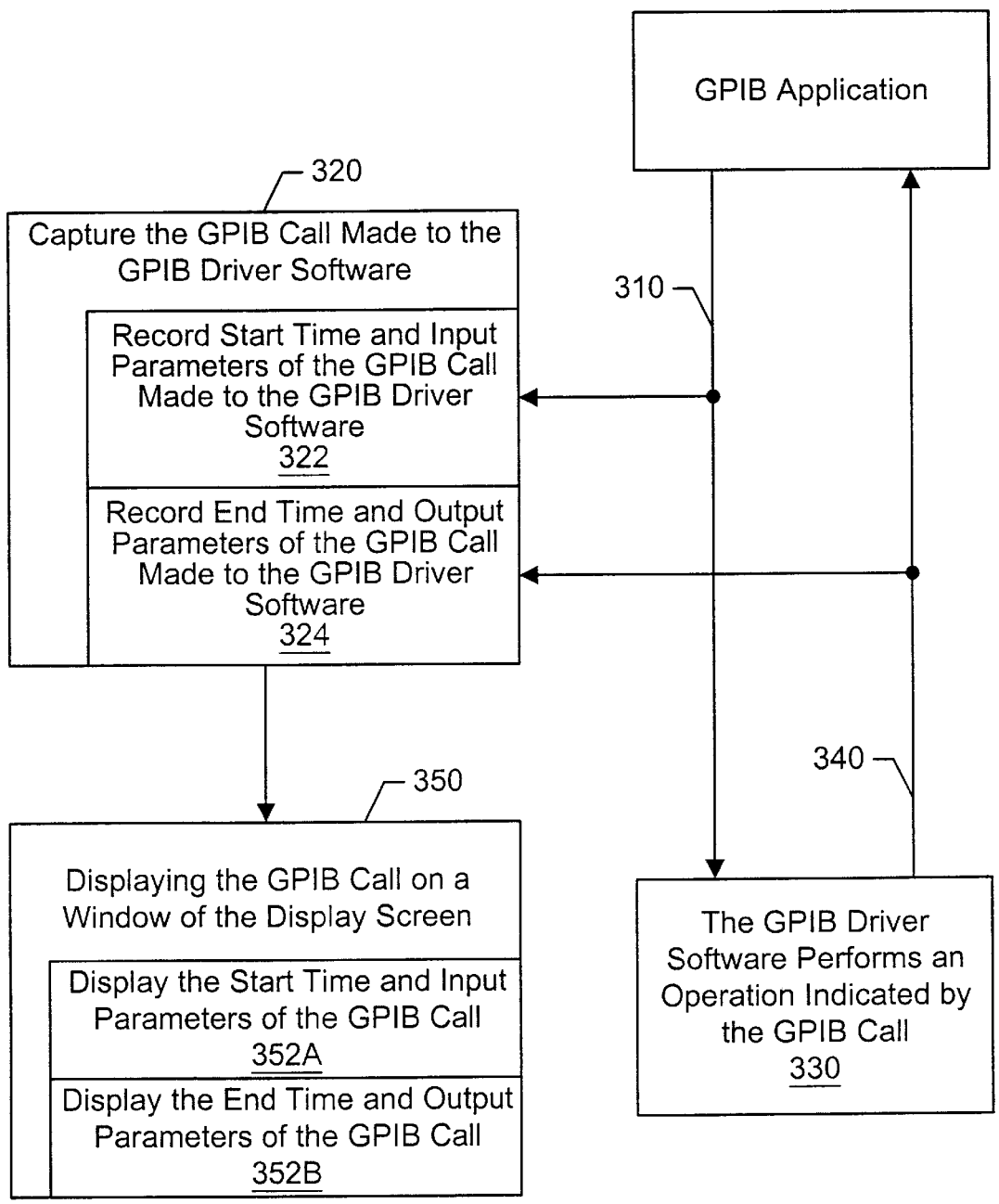
FIG. 3 is a flowchart diagram of the computer-implemented method according to the present invention.

GPIB Spy comprises a computer-implemented method for monitoring GPIB calls made to the GPIB driver software by the GPIB application. Please refer now to FIG. 3 for a flowchart of this computer-implemented method according to the present invention. In the preferred embodiment of the invention, GPIB Spy is implemented with a Win32-based graphical user interface. In particular, the GPIB application makes a GPIB call to the GPIB driver software. The GPIB call is represented by flow control line 310. GPIB Spy is configured to capture the GPIB call as represented by step 320. Capturing the GPIB call includes recording the start time and input parameters for the GPIB call (see step 322). In the preferred embodiment of the invention, capturing the GPIB call further includes recording the output parameters, and end time of the GPIB call.

In response to the GPIB call, the GPIB driver software performs an operation involving the activity of the GPIB interface. The performance of this operation is indicated by step 330. For example, reading (or writing) a block of data from (to) one of the GPIB instruments is a typical GPIB operation. Flow control line 340 represent the return of control to the GPIB application. Note that the return of control to the GPIB application does not necessarily indicate completion of the operation performed by the GPIB driver software.

In addition to the start time and input parameters, GPIB Spy is configured to record the end time and the output parameters of the GPIB call (see step 324). GPIB calls may be synchronous or asynchronous. For a synchronous GPIB call, the GPIB driver software returns control to the GPIB application after completion of the invoked operation. For an asynchronous GPIB call, the GPIB driver software returns control to the GPIB application immediately, and subsequently performs the operation indicated by the GPIB call. Thus, for a synchronous GPIB call, the end time of the GPIB call indicates the time the invoked operation completed. In contrast, for an asynchronous GPIB call, the end time of the GPIB call corresponds to the time the GPIB driver software returns control to the GPIB application: the invoked operation completes at some later time.

Furthermore, in step 350, GPIB Spy displays the GPIB call on a window of the display screen of computer 102. Step 350 includes step 352A of displaying the start time and input parameters of the GPIB call, and step 352B of displaying the end time and output parameters of the GPIB call.

Figure 4:
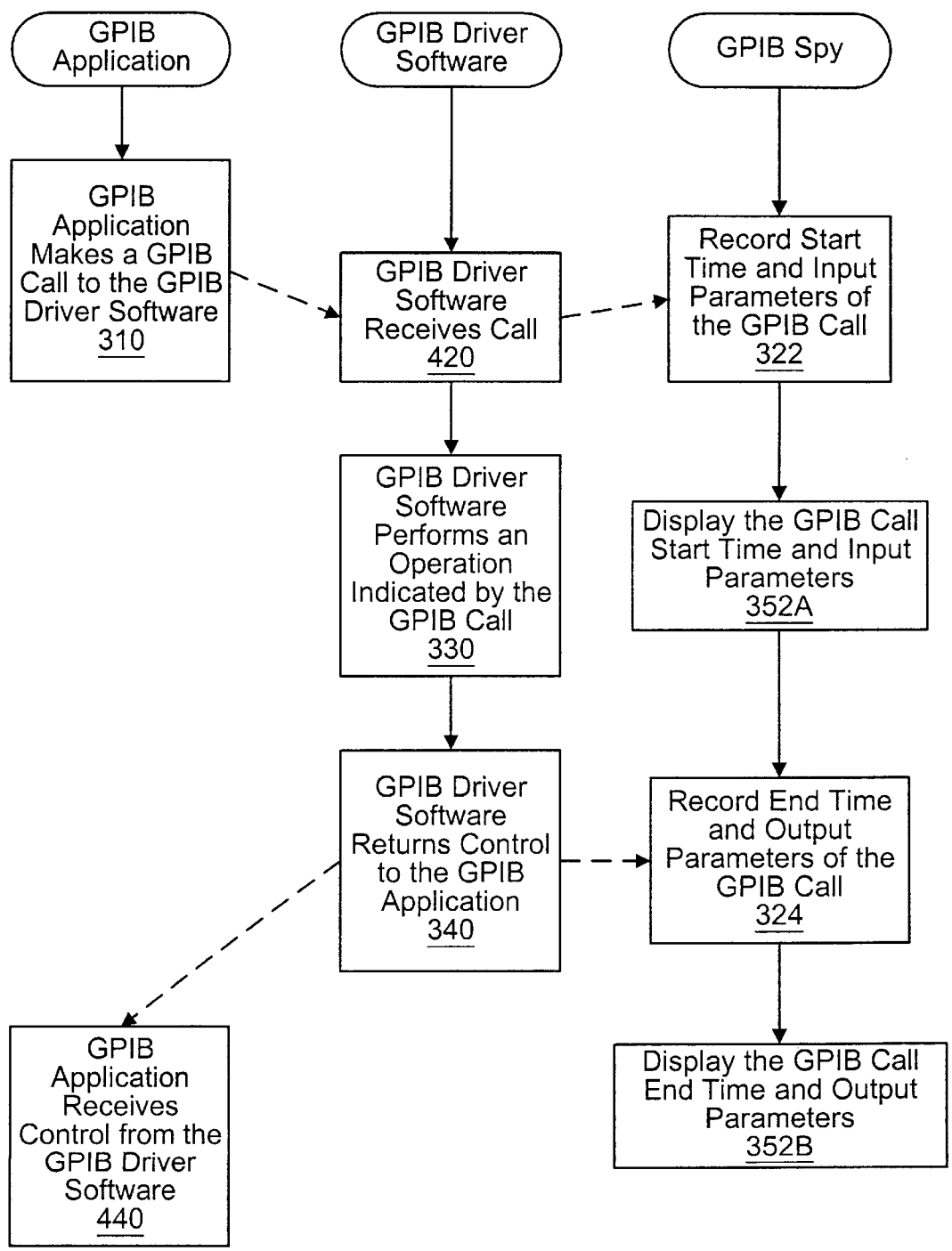
FIG. 4 presents a flowchart for the case of a synchronous GPIB call to the GPIB driver software according to the present invention.

Please refer now to FIG. 4 which presents a flowchart for the case of a synchronous GPIB call to the GPIB driver software. In step 310 (the same 310 as in FIG. 3), the GPIB application makes a synchronous GPIB call to the GPIB driver software. In step 420, the GPIB driver software receives the synchronous GPIB call made by the GPIB application. In response to the GPIB driver software receiving the synchronous GPIB call, GPIB Spy records the start time of the GPIB call and other input data associated with the GPIB call. This recording comprises step 322 (same step 322 as in FIG. 3). In the preferred embodiment of the invention, this other data which is captured includes the input parameters of the GPIB call. Additionally, in response to the GPIB driver receiving the synchronous GPIB call, the GPIB driver software performs an operation indicated by the GPIB call. The operation involves the activity of the GPIB interface. The performance of this operation comprises step 330 (identical to step 330 of FIG. 3). In response to the completion of the operation of step 330, the GPIB driver software returns control to the GPIB application. This returning of control comprises step 340 which is identical to 340 of FIG. 3. In response to step 340, GPIB Spy records the end time and output parameters of the GPIB call (see step 324). In step 352B, GPIB Spy displays the end time and output parameters of the GPIB call. Also, in response to step 340, the GPIB application receives control from the GPIB driver software (see step 440).

Figure 5:
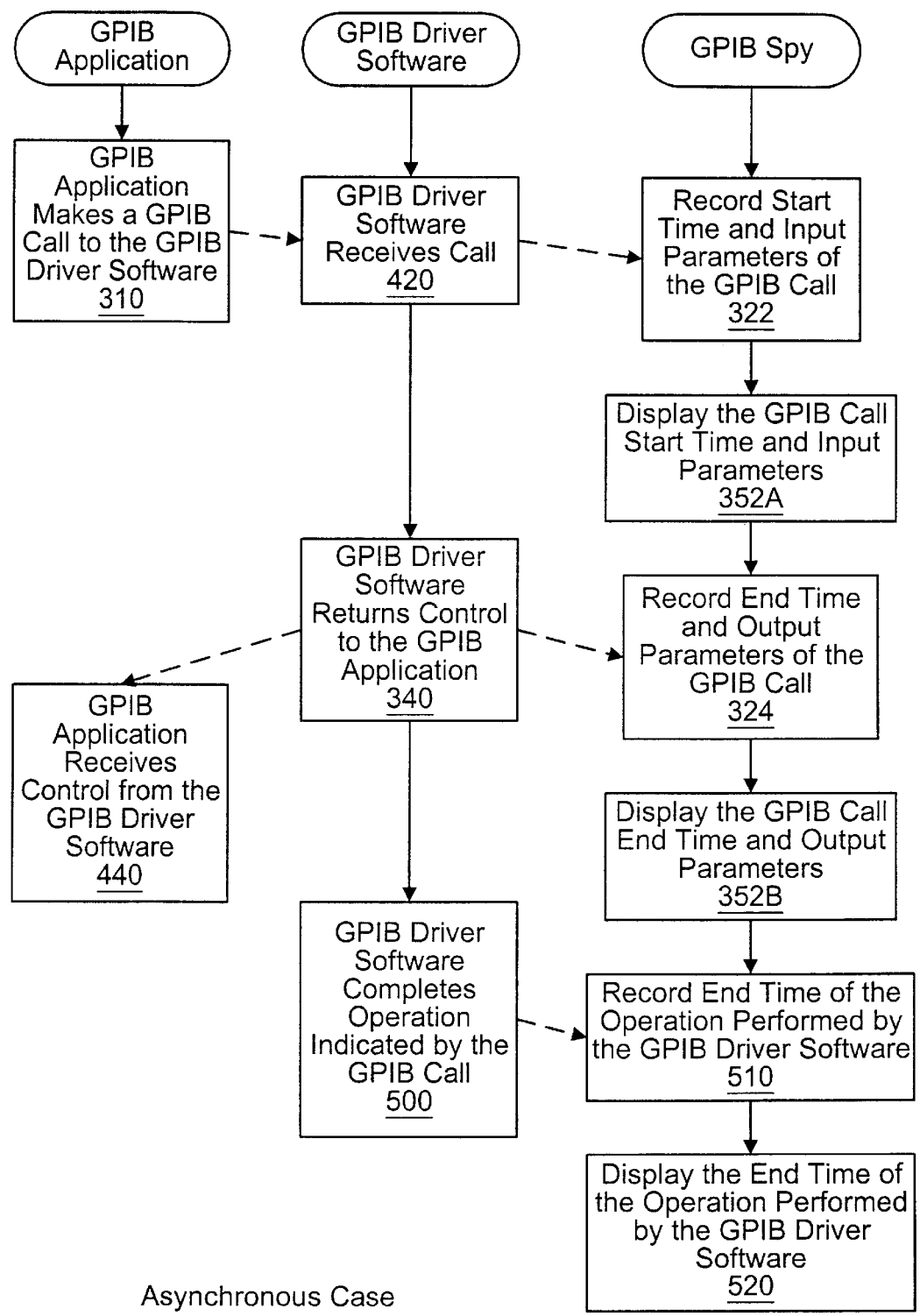
FIG. 5 presents a flowchart for the case of an asynchronous GPIB call to the GPIB driver software according to the present invention.

Please refer now to FIG. 5 for a flowchart which presents the case of an asynchronous GPIB call to the GPIB driver software. In the asynchronous case, the GPIB application makes an asynchronous GPIB call to the GPIB driver software (see step 310). In response to the asynchronous GPIB call, the GPIB driver software receives the asynchronous GPIB call (see step 420). In response to receiving the GPIB call (step 420), the GPIB driver software immediately returns control to GPIB application (step 340). This is in contrast to the synchronous GPIB call where control is returned to the GPIB application only after completion of the invoked GPIB operation. In response to the GPIB driver software receiving the asynchronous GPIB call, GPIB Spy records the start time and input parameters of the asynchronous GPIB call (step 322). After step 322, GPIB Spy displays the start time and input parameters of the GPIB call (step 352A). In response to the GPIB driver software returning control to the GPIB application (step 340), the GPIB application receives control from the GPIB driver software (step 440). Also, in response to the GPIB driver software returning control to the GPIB application, GPIB Spy records the end time and output parameters of the GPIB call (step 324). In step 352B, GPIB Spy displays the end time and output parameters of the GPIB call. In step 500, the GPIB driver software completes the operation indicated by the GPIB call. In response to step 500, GPIB Spy records the end time of the operation performed by the GPIB driver software (step 510). In step 520, GPIB Spy displays the end time of the operation performed by the GPIB driver software.

FIG. 6: Main Window of the GPIB Spy Graphical User Interface

Please refer now to FIG. 6 for a screen shot of the main window of the GPIB Spy graphical user interface. The main window displays a scrollable list of GPIB calls. The GPIB calls are listed in the order they are made by the GPIB application. Each line of the scrollable list displays a GPIB call. A line includes the follow data: (1) the number of the GPIB call according to order of occurrence; (2) a C-language function prototype which includes the name of the GPIB call and its parameters; (3) the value of three global values associated with the GPIB call—ibsta, iberr, and ibcntl; and (4) the start time of the GPIB call.

In addition the main window displays a running count of the total number of GPIB calls asserted during the current capture session. See the Call Count display box at the bottom right of the main window.

GPIB Spy is configured to capture and display GPIB calls made to the GPIB driver software by the GPIB application in real time. GPIB Spy is a diagnostic tool for verifying that the communication between the application and the GPIB instrument(s) is correct. If an error occurs in a GPIB call, GPIB Spy highlights the display line corresponding to the GPIB call. Thus, the user is able to quickly locate and analyze erroneous GPIB calls made by the GPIB application.

Controlling Capture Mode

The primary function of GPIB Spy is to capture and display GPIB calls to the main window of the display screen. When the user opens GPIB Spy, capture mode is turned on by default. However, capture may be turned on or off in response to user commands. When capture mode is turned off, GPIB calls made by the GPIB application are not captured. For example, after GPIB Spy has captured an erroneous GPIB call, the user may turn off capture mode to more closely study the parameters and data associated with the erroneous GPIB call.

When capture mode is turned on, the title bar of the main window reads "capture on", and the stoplight button shows a red light. If capture mode is turned off, the title bar of the main window reads "capture off", and the stoplight button shows a green light. Once the user turns capture mode on, the user can run a GPIB application and then return to GPIB Spy to view the captured GPIB calls.

The user turns on capture mode by performing one of the following operations: (a) pressing special function key <F8> on the keyboard; (b) selecting the "Start Capture" menu item from the down-down "Spy" menu; or (c) dragging a mouse cursor to the green stoplight button on the toolbar and clicking the mouse button. Note, that if "Stop Capture" is the first choice on the Spy menu instead of Start Capture, then capture is already on.

The user turns off capture mode by performing one of the following operations: (a) pressing special function key <F8> on the keyboard; (b) selecting "Stop Capture" from the drop-down "Spy" menu; or (c) clicking on the red stoplight button on the toolbar.

Call History Depth

GPIB Spy stores a user adjustable number of the most recent GPIB calls in a capture buffer. The contents of the capture buffer are displayed in the main window. By scrolling up and down in the main window, the user can view any GPIB call in the capture buffer. The user can customize the number of captured calls kept in the GPIB Spy capture buffer. When the number of GPIB calls exceeds the specified number of captured calls kept, only the most recent calls are retained. GPIB Spy stops capture if the computer 102 runs out of memory. To view or modify the call history depth, the user selects the item "Options" from the "Spy" menu, or clicks on the "Options" button. By default, GPIB Spy displays 100 calls in the capture buffer.

FIGS. 7–10: Viewing Detailed Call Information

In addition to the summary data displayed in the main window, the user has the option for viewing detailed call information for every GPIB call in the capture buffer. The user can view detailed information on a specific GPIB call by performing one of the following input operations: (a) double-clicking on the GPIB call display line in the main window; (b) clicking on the GPIB call display line and pressing the <Enter> key; (c) clicking on the GPIB call display line and selecting the item "Properties" from the "View" menu; or (d) clicking on the GPIB call display line and then clicking on the Properties button on the toolbar. In response to any one of the input operations just described, GPIB Spy displays a Properties dialog box which contains detailed information for the selected GPIB call. The Properties dialog box includes one or more overlaid pages. The Properties dialog box always includes a general page, usually includes input and output pages, and sometimes includes a buffer page.

Figure 7:
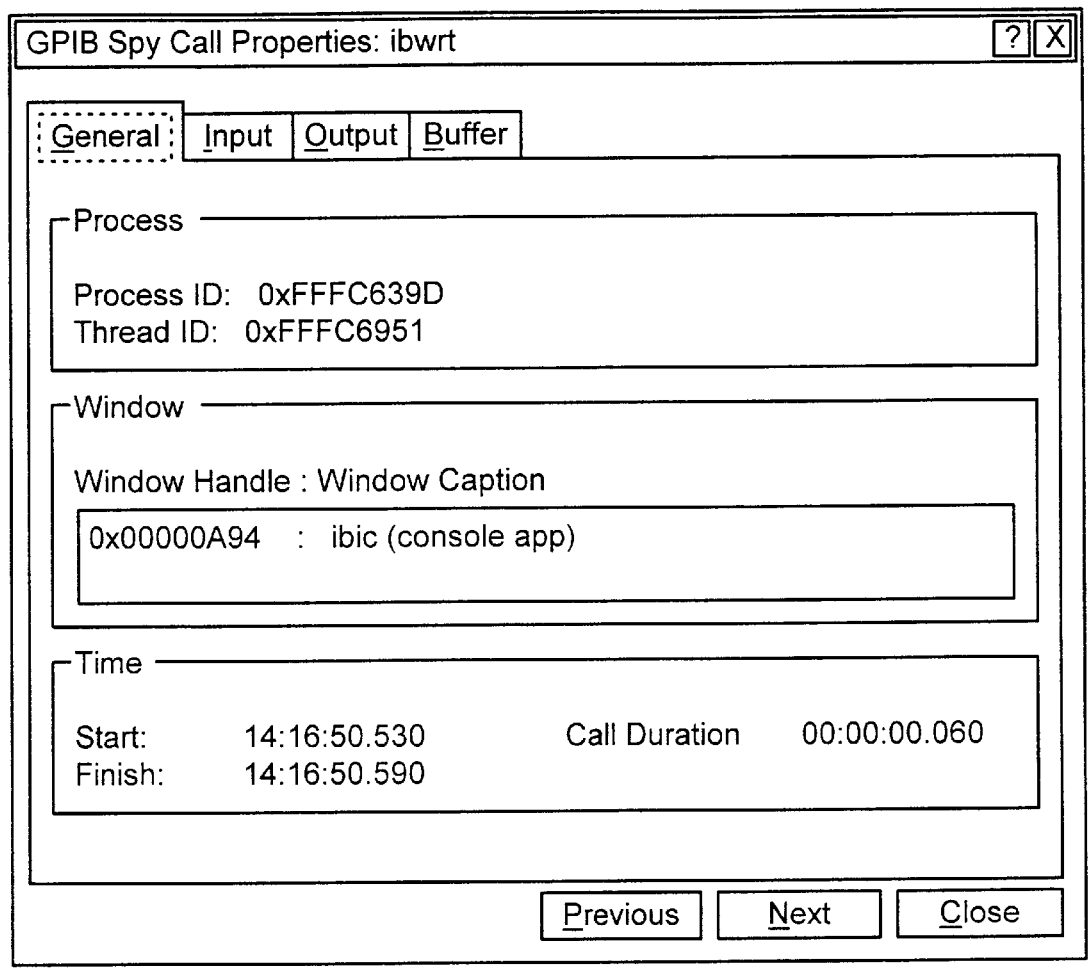
FIG. 7 presents a screen shot of the General page of the Properties dialog box according to the present invention, where the Properties dialog box contains detailed information for a selected GPIB call.

Please refer now to FIG. 7 for a screen shot of a typical General page of the Properties dialog box. The General page displays information about the GPIB application that made the GPIB call including process ID, thread ID, window handle, which uniquely identifies the window in the system, and window caption which is the text string that is printed in the title bar of the window In addition, the General page displays the start time, end time, and duration of the GPIB call.

Figure 8:
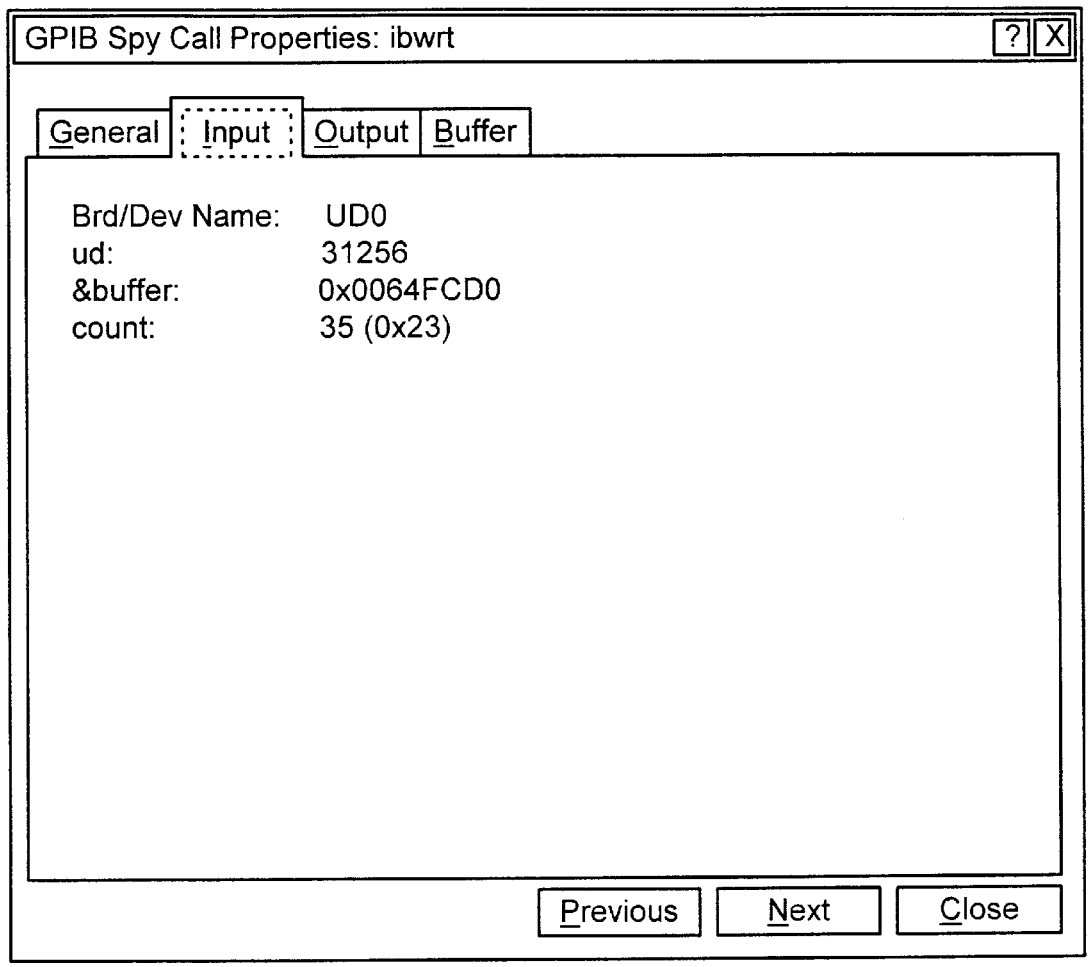
FIG. 8 illustrate a screen shot of the Input page of the Properties dialog box according to the present invention.

Please refer now to FIG. 8 for a screen shot of a typical Input page of the Properties dialog box. The Input page displays the input parameters of the selected GPIB call except for buffer information.

Figure 9:
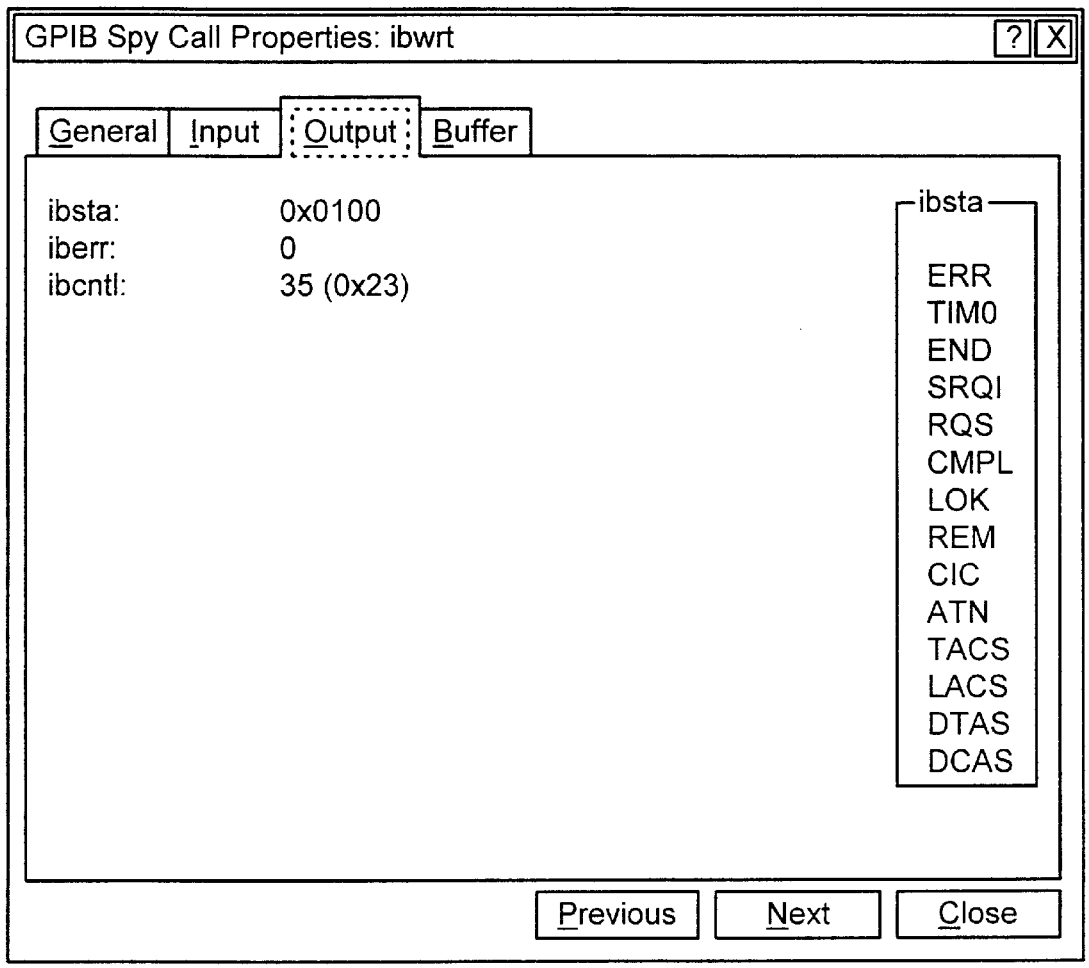
FIG. 9 illustrates a screen shot of the Output page of the Properties dialog box according to the present invention.

Please refer now to FIG. 9 for a screen shot of a typical Output page of the Properties dialog box. When the GPIB driver software completes the operation indicated by a GPIB call, three GPIB global status variables (ibsta, iberr, and ibcntl) and any other output information are returned to the application. The Output page displays these returned parameters for the selected GPIB call except for any output buffer information. Please refer now to FIG. 10 for a screen shot of a typical Buffer page. The Buffer page displays input and/or output buffer information for the selected GPIB call. Refer to the next section for more information on buffers.

Capturing and Displaying Read/Write Buffer Data

For GPIB calls, such as ibrd or ibwrt, which involve reading data into a buffer or writing data from a buffer, the GPIB driver software sends a copy of the buffer data to GPIB Spy. In the case of a GPIB call which involves writing from a buffer, the GPIB driver software sends a copy of the buffer data to GPIB Spy before transferring the buffer data across the GPIB. In the case of a GPIB call which involves reading into a buffer, the GPIB driver software reads the data across the GPIB before copying the buffer data to GPIB Spy. In both cases, the GPIB driver software also sends the buffer start address to GPIB Spy.

Thus, GPIB Spy stores the buffer data for GPIB calls which involve reading or writing data. For GPIB calls which are removed from the capture buffer due to exceeding the call history depth, the associated buffer data is purged. [Note that the user has the option to invoke a data logging mode for permanent storage of GPIB calls and their associated buffer data.]

As with the other detailed information, the user can display the buffer data for a GPIB call by selecting the GPIB call from the main window and selecting the Properties dialog box as discussed above. The fourth page of the Properties dialog box, the Buffer page, displays the buffer data for the GPIB call. The Buffer page appears in the Properties dialog box only for GPIB calls that involve reading or writing a data buffer. The user can specify how much data from the buffer is displayed in the Buffer page by choosing the brief or full buffer display mode. In the brief buffer mode, GPIB Spy displays a maximum of 64 bytes of data in the Buffer page. If the GPIB call wrote or read more data than 64 bytes, GPIB Spy displays only the first and last 32 bytes of data. In the full buffer mode, GPIB Spy displays a maximum of 64 Kbytes of data for each GPIB call. If a call reads or writes more data than 64 Kbytes, GPIB Spy displays only the first and last 32 Kbytes of data. The full buffer mode may significantly slow down the performance of the user's GPIB application.

Figure 10:
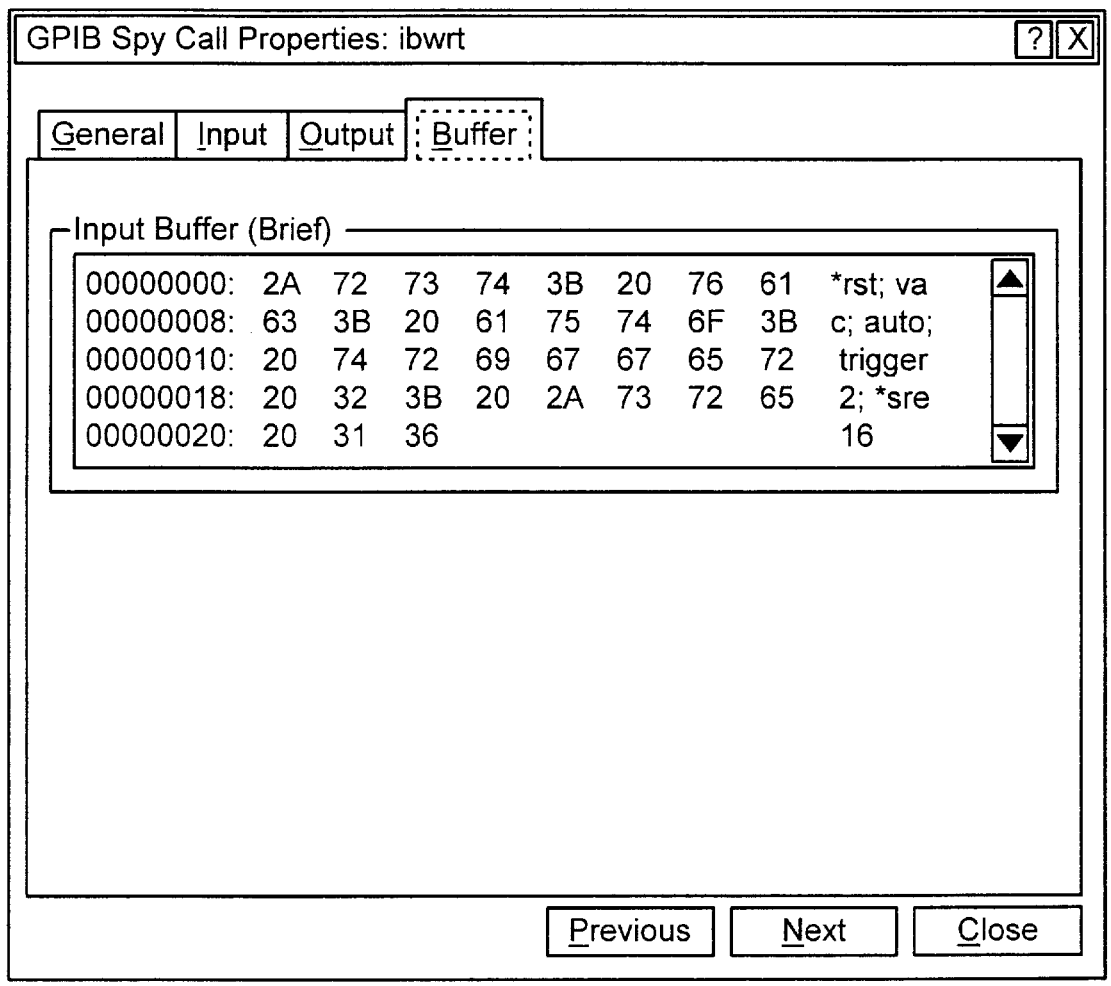
FIG. 10 illustrates a screen shot of the Buffer page of the Properties dialog box according to the present invention.

Please refer now to FIG. 10 for a screen shot of the Buffer page of the Properties dialog box. The title bar of the Properties Dialog box indicates the name of the GPIB call being analyzed: ibwrt in this case. The Buffer page includes a data display window which displays the content of the buffer data associated with the GPIB call. The data is displayed in hexadecimal and ASCII formats. The caption above the data display window indicates that brief buffer mode is in effect. The ability to examine the buffer data associated with a GPIB call allows the user to verify the integrity of data transfers, and to diagnose errors in read/write oriented GPIB calls.

Saving Captured GPIB Call Information as a Spy Capture File

GPIB Spy allows the user to save the information in the GPIB Spy capture buffer as a Spy capture file. The user selects "Save As" from the "File" menu or clicks on the "Save As" button in the toolbar. In the dialog box that appears, the user types a name for the capture file to be created, or selects an existing file to overwrite. If the user wants the GPIB Spy information in the capture buffer to be saved incrementally, as soon as it is recorded, the File Logging feature of GPIB Spy is more appropriate. The File Logging Feature will be described in more detail below.

Opening a Previously Saved Spy Capture File

GPIB Spy allows the user to open a Spy capture file that was previously saved in the Spy capture format. To open a Spy capture file, the user either (a) selects "Open" from the "File" menu, or (b) clicks on the "Open File" button on the toolbar. In the dialog box that appears, the user types the name of the Spy capture file to be opened. GPIB Spy opens the file and loads the capture buffer (main window of display screen) with the GPIB call information stored in the specified Spy capture file. Note that after opening a previously saved Spy capture file, the user may export it to a Spy -text file if desired.

Exporting Captured GPIB Call Information as a .txt File

The user also has the option of exporting GPIB call information as a text file with .txt extension. However, the exported file saves only a portion of the information recorded for the GPIB calls in the capture buffer (main window). To save all of the information recorded for the GPIB calls in the capture buffer, use the "File," "Save As,"

option described in a previous section. The user exports GPIB call information to a .txt file by selecting the item "Export" from the "File" menu of the main window.

Clearing GPIB Spy Captured Data

GPIB Spy provides an option for clearing out the capture buffer, i.e., discarding the recorded GPIB calls. For example, if the user desires to run the GPIB application under different conditions, the user may desire to clear the capture buffer. To clear the capture buffer, the user either (a) selects "Clear" from the "Spy" menu, or (b) clicks the "Clear" button on the toolbar.

Logging Captured Data to a Spy Capture File

GPIB Spy provides a File Logging feature that automatically saves GPIB calls (and their associated data) to a Spy capture File. If file logging is enabled, the output file is opened, written, and closed as soon as each GPIB call is recorded. This option is useful in debugging a GPIB application that causes the GPIB system to crash before the user has an opportunity to save the contents of the Spy capture buffer. In this case, if file logging is enabled, the user can restart the system and open the Spy capture file to see the sequence of GPIB calls that were made just prior to the system crash.

In order to log GPIB call information to a Spy capture log file, the user performs the following sequence of operations: (a) user selects "Options" from the "Spy" menu, or clicks on the "Options" button on the toolbar; (b) in the "File Logging" box, user checks the "Log to File" checkbox; and (c) in the edit box, user either types the path and the name for the log file, or clicks the Browse button to find a Spy capture file to overwrite.

If file logging is enabled, the name and the full path of the log file are displayed in the right area of the toolbar of the main window. Note that using File Logging is likely to slow down the GPIB system. In addition, if computer 102 is low on disk space, choosing this option could cause computer 102 to run out of disk space. To turn off the File Logging feature, deselect the "Log to File" check box.

Capture Options

GPIB Spy allows the user to view or modify the state of various options such as file logging, call history depth, or buffer mode. By selecting "Options" from the "Spy" menu, or clicking on the "Options" button on the toolbar, a dialog box appears displaying the value of various GPIB Spy options. By default, the call history depth is 100, brief buffer mode is enabled, and file logging is disabled.

Printing GPIB Spy Data

GPIB Spy allows the user to print the current contents of the GPIB Spy capture buffer (main window) by selecting the item "Print" from the "File" menu, or by clicking on the "Print" button on the toolbar. To print information previously saved in a Spy capture file, the user must first open the Spy capture file in GPIB Spy, and then print it.

FIG. 11: Replacing Driver Module Upon Entrance

Typically, the user will use GPIB Spy in order to debug the GPIB calls made by the GPIB application. However, when the GPIB application has been debugged, the user may be more interested in running the GPIB application without GPIB call capture and display for performance reasons. To facilitate these different modes of operation, the GPIB driver software includes two modules which are interchangable. The first module is optimized for performance, and thus does not include a software interface to GPIB Spy. In contrast, the second module is designed with the ability to capture GPIB calls and includes a software interface to send captured call data to GPIB Spy. In particular, the second module includes code which tests whether GPIB Spy capture mode is turned on, and if so, the second module sends captured GPIB call data to GPIB Spy. The first module, since it does not include capture capabilities, is more efficient and is the module of choice if the user is not concerned with GPIB call capture and display. The first and second module perform the same function so far as the GPIB application is concerned. However, the second module includes the additional capability to capture GPIB calls and route them to GPIB Spy if capture mode is turned on.

When GPIB Spy is invoked by the user, GPIB Spy checks which of the two modules is currently present in the GPIB driver software. If the second (Spy-enabled) module is not present, a dialog box appears which prompts the user for choice of either (a) replacing the first module with the second (Spy-enabled) module in the GPIB driver software, or (b) performing no replacement and therefore retaining the first module in the GPIB driver software. The first choice (a) is the default. If the user intends to use GPIB Spy to capture and display GPIB calls, the user must make selection (a), since the second module is essential for call capture. If the user intends to use GPIB Spy only to view previously save Spy capture file(s), then the user may retain the first module by making the selection (b).

Please refer now to FIG. 11 which presents a flowchart of the operation of the present invention with the module replacement feature upon entrance to GPIB Spy. In step 1100, GPIB Spy receives user input enabling GPIB capture mode. In step 1100, GPIB Spy replaces a first module in the GPIB driver software with a second (Spy-enabled) module. In step 1120, the GPIB application makes a GPIB call to the GPIB driver software. In step 1130, the second module in the GPIB driver software captures the GPIB call made to the GPIB driver software. In step 1140, the GPIB call is displayed on a window of the display screen. In the preferred embodiment of the invention, GPIB Spy is not part of the GPIB driver software. Thus the second module must send GPIB call data to GPIB Spy so that GPIB Spy may perform the display operation. In an alternate embodiment of the invention, GPIB Spy is incorporated into the GPIB driver software.

FIG. 12: Replacing Driver Module Before Exiting

When the user is finished using GPIB Spy, a user might want to switch back to first (streamlined) module, since the second (Spy-enable) module can slow down the performance of other GPIB applications. To switch back to the first (streamlined) module before exiting GPIB Spy, the user selects "Restore Software on Exit" from the "Spy" menu. Please refer to FIG. 12 for a flowchart of the module restoration feature of the present invention. In step 1200, GPIB Spy receives user input disabling the GPIB call capture mode. In step 1210, GPIB Spy replaces the second (Spy-enabled) module of the GPIB driver software with the first (streamlined) module.

Performance Considerations

GPIB Spy can slow down the performance of user's GPIB application, and certain configurations of GPIB Spy have a larger impact on performance than others. For example, configuring GPIB Spy to log calls to an output file or to use full buffer mode might have a significant effect on the performance of both the GPIB application and the GPIB system. GPIB Spy should only be used while user is debugging the GPIB application or when performance is not critical.

Getting Help in GPIB Spy

GPIB Spy includes a Help facility to make the graphical user interface more accessible to the user. To access help information on one of the GPIB calls displayed in the main capture window, the user performs one of the follow input operations: (a) in the GPIB Spy capture buffer, the user clicks on the GPIB call and then selects "Help on Function" from the "Help" menu; or (b) in the GPIB Spy capture buffer, the user clicks on the "Help" toolbar button, and then clicks on the GPIB call.

To access context-sensitive help information for a dialog box, the user clicks on the question mark button in the upper right corner of the dialog box, and then clicks on any area of the dialog box for which help information is desired. Furthermore, to access context-sensitive help information for the capture buffer, menu and toolbar items, and other controls, the user clicks on the "Help" toolbar button, and then clicks on an item for which help information is desired.

Conclusion

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for monitoring General Purpose Interface Bus (GPIB) calls made to GPIB driver software by a GPIB application, wherein the GPIB driver software controls a GPIB interface, wherein the GPIB interface connects to one or more GPIB instruments, wherein the GPIB application and the GPIB driver software execute on a computer system, wherein the computer system includes a display screen, the method comprising:

the GPIB application making a GPIB call to the GPIB driver software;

capturing said GPIB call made to the GPIB driver software, wherein said capturing said GPIB call includes recording a start time of the GPIB call made to the GPIB driver software;

the GPIB driver software performing an operation indicated by the GPIB call;

wherein said capturing includes recording an end time of the GPIB call made to the GPIB driver software;

displaying said GPIB call on a window of the display screen, wherein said displaying includes displaying said start time of the GPIB call and said end time of the GPIB call.

2. The method of claim 1, wherein said GPIB call is a synchronous call, wherein said recording an end time of the GPIB call made to the GPIB driver software comprises recording an end time of the operation performed by the GPIB driver software in response to said GPIB call.

3. The method of claim 1, wherein said capturing also comprises capturing input parameters and return parameters for said GPIB call;

wherein said displaying comprises displaying summary data for each captured GPIB call on said window of said display screen in real time, wherein said summary data includes said input parameters, said return parameters, said start time and said end time.

4. The method of claim 1, wherein the method repeats for a plurality of GPIB calls made by the GPIB application to the GPIB driver software.

5. The method of claim 1, wherein said capturing said GPIB call and said displaying said GPIB call are performed by the GPIB driver software.

6. The method of claim 1, wherein said GPIB call is an asynchronous call, wherein the GPIB driver software performs the operation asynchronously;

wherein said recording an end time of the GPIB call made to the GPIB driver software comprises recording a time when the GPIB driver software returns control to the GPIB application from the GPIB call;

wherein said displaying comprises displaying said start time of the GPIB call and displaying said time when the GPIB driver software returns control to the GPIB application from the GPIB call.

7. The method of claim 6, further comprising:

recording an end time of the operation performed by the GPIB driver software in response to said GPIB call;

wherein said displaying further comprises displaying said end time of the operation performed by the GPIB driver software.

8. The method of claim 7, wherein said recording an end time of the operation performed by the GPIB driver software occurs after said recording a time when the GPIB driver software returns control to the user application from the GPIB call.

9. A computer-implemented method for monitoring General Purpose Interface Bus (GPIB) calls made to GPIB driver software by a GPIB application, wherein the GPIB driver software controls a GPIB interface, wherein the GPIB interface connects to one or more instruments, wherein the GPIB application and the GPIB driver software execute on a computer system, wherein the computer system includes a display screen, the method comprising:

the GPIB application making an asynchronous GPIB call to the GPIB driver software;

capturing said asynchronous GPIB call made to the GPIB driver software, wherein said capturing said GPIB call includes recording a start time of the GPIB call made to the GPIB driver software;

the GPIB driver software asynchronously performing an operation indicated by the call;

wherein said capturing includes recording a time when the GPIB driver software returns control to the GPIB application from the GPIB call;

displaying said GPIB call on a window of the display screen, wherein said displaying further includes displaying said start time of the GPIB call and said time when the GPIB driver software returns control to the GPIB application.

10. The method of claim 9, further comprising:

recording an end time of the asynchronous operation performed by the GPIB driver software in response to said GPIB call;

wherein said displaying further comprises displaying said end time of the asynchronous operation performed by the GPIB driver software.

11. A computer-implemented method for monitoring General Purpose Interface Bus (GPIB) calls made to GPIB driver software by a GPIB application, wherein the GPIB driver software controls a GPIB interface, wherein the GPIB interface connects to one or more instruments, wherein the GPIB application and the GPIB driver software execute on a computer system, wherein the computer system includes a display screen, the method comprising:

receiving user input enabling a GPIB call capture mode;

replacing a first module in the GPIB driver software with a second module, wherein the first module performs a first GPIB driver function and does not include capture capabilities, and wherein the second module performs said first GPIB driver function and includes capture capabilities;

the GPIB application making a GPIB call to the GPIB driver software;

the second module in the GPIB driver software capturing said GPIB call made to the GPIB driver software;

the second module in the GPIB driver software displaying said GPIB call on a window of the display screen.

12. The method of claim 11, further comprising:

receiving user input disabling the GPIB call capture mode;

replacing the second module in the GPIB driver software with the first module;

wherein GPIB calls to the GPIB driver software are not captured in response to said replacing.

13. A method for monitoring GPIB calls made to GPIB driver software by a GPIB application, wherein the GPIB driver software controls a GPIB interface, wherein the GPIB interface connects to one or more instruments, the method comprising:

the GPIB application making one or more calls to the GPIB driver software;

capturing said GPIB calls made to said GPIB driver software;

displaying said calls on a first window of a computer screen;

wherein said capturing comprises capturing input parameters, return parameters, time of occurrence and duration for each of said GPIB calls;

wherein said displaying comprises displaying summary data for each captured GPIB call on said first window of said computer screen in real time, wherein said summary data includes said input parameters, return parameters, and time of occurrence.

14. The method of claim 13, further comprising a means for selecting and deselecting the logging of captured GPIB calls to a file, wherein said logging comprises writing said file with said summary data for each captured GPIB call.

15. The method of claim 14, wherein first window is part of a graphical user interface, wherein said means for selecting and deselecting the logging of captured GPIB calls comprises selecting an graphical icon and specifying a file name.

16. The method of claim 13, wherein said first window includes means for enabling and disabling said capturing of GPIB calls.

17. The method of claim 16, wherein said first window is part of a graphical user interface, and wherein said means for enabling and disabling said capturing of GPIB calls comprises selecting or deselecting a graphical icon displayed on said first window of said computer screen.

18. The method of claim 16, wherein said first window is part of a graphical user interface, and wherein said means for enabling and disabling said capturing of GPIB calls comprises making a menu selection.

19. The method of claim 13, wherein said first window includes a means for selecting and deselecting the display of detailed data for each of said GPIB calls displayed in said first window, wherein said selecting the display of detailed data for a GPIB call invokes the display of a second window on said computer screen.

20. The method of claim 19, wherein said first window is part of a graphical user interface, and wherein said means for selecting the display of detailed data for a GPIB call comprises double-clicking on said summary data for said GPIB call.

21. The method of claim 19, wherein said first window is part of a graphical user interface, and wherein said means for selecting the display of detailed data for a GPIB call comprises single-clicking on said summary data for said GPIB call, and performing a menu selection.

22. The method of claim 19, wherein said second window displays the process ID, thread ID, start time, and finish time for said selected GPIB call.

23. The method of claim 19, wherein said second window displays a detailed listing of the input parameters for said selected GPIB call.

24. The method of claim 19, wherein said second window displays a detailed listing of the output parameters for said selected GPIB call.

25. The method of claim 19, wherein said storing transferred data for a GPIB call comprises storing said transferred data up to a user defined limit.

26. The method of claim 19, wherein said capturing GPIB calls further comprises:

identifying GPIB calls which involve data transfer across the GPIB interface; and storing transferred data for each of said GPIB calls which involve data transfer.

27. The method of claim 26, wherein said second window displays said stored transferred data.

28. A General Purpose Interface Bus (GPIB) system, comprising a computer system including a CPU, memory, and a display screen, wherein the memory stores a GPIB application and GPIB driver software;

a GPIB interface coupled to the computer system;

wherein the GPIB driver software controls the GPIB interface;

wherein the GPIB application makes a GPIB call to the GPIB driver software to control the GPIB interface;

wherein the GPIB driver software is operable to capture the GPIB call made to the GPIB driver software, wherein said capturing includes recording a start time of the GPIB call made to the GPIB driver software;

wherein the GPIB driver software is operable to perform an operation indicated by the GPIB call;

wherein said capturing includes recording an end time of the GPIB call made to the GPIB driver software;

wherein the GPIB driver software is operable to display the GPIB call on a window of the display screen, wherein said displaying includes displaying said start time of the GPIB call and said end time of the GPIB call.

* * * * *